US010785027B2

(12) United States Patent
Livingston et al.

(10) Patent No.: US 10,785,027 B2
(45) Date of Patent: Sep. 22, 2020

(54) SYSTEMS AND METHODS FOR ACCESSING AND CONTROLLING MEDIA STORED REMOTELY

(75) Inventors: Edward Livingston, Toronto (CA); Yuriy Blokhin, Waterloo (CA)

(73) Assignee: KIK Interactive Inc., Waterloo, Ontario (CA)

( * ) Notice: Subject to any disclaimer, the term of this patent is extended or adjusted under 35 U.S.C. 154(b) by 1633 days.

(21) Appl. No.: 12/974,041

(22) Filed: Dec. 21, 2010

(65) Prior Publication Data

US 2012/0005311 A1 Jan. 5, 2012

Related U.S. Application Data

(60) Provisional application No. 61/288,622, filed on Dec. 21, 2009.

(51) Int. Cl.
*H04L 9/32* (2006.01)
*G06F 21/62* (2013.01)
(Continued)

(52) U.S. Cl.
CPC ............ *H04L 9/32* (2013.01); *G06F 21/6218* (2013.01); *H04L 9/3226* (2013.01);
(Continued)

(58) Field of Classification Search
CPC ....... H04L 9/32; H04L 9/3226; H04L 63/083; H04L 63/10; H04L 2209/56;
(Continued)

(56) References Cited

U.S. PATENT DOCUMENTS 5,708,804 A 1/1998 Goodwin et al.
5,905,863 A 5/1999 Knowles et al.
(Continued)

FOREIGN PATENT DOCUMENTS

CA 2353161 1/2002
CA 2485791 1/2002
(Continued)

OTHER PUBLICATIONS

Verizon | FiOS TV Central—Manage Your FiOS TV Online, [Online] Retrieved from the Internet <URL: https://www22.verizon.com/fiostv/web/unprotected/App_FiOSMobileRemote.aspx> Jan. 10, 2012 (1 page).
(Continued)

*Primary Examiner* — Emmanuel L Moise
*Assistant Examiner* — Xiang Yu
(74) *Attorney, Agent, or Firm* — Cooley LLP

(57) ABSTRACT

In some embodiments, an apparatus includes a server that stores a set of media files. The server is configured to send an authentication code to a first communication device in response to a request from the first communication device to access the set of media files such that the first communication device can present the authentication code to a user. The server is configured to associate an identifier of a second communication device with the first communication device such that a user of the second communication device can authorize access to the set of media files from the first communication device by sending the authentication code to the server using the second communication device.

25 Claims, 5 Drawing Sheets

(51) Int. Cl.
*H04W 12/06* (2009.01)
*H04W 12/00* (2009.01)
*H04L 29/06* (2006.01)
*H04N 21/258* (2011.01)

(52) U.S. Cl.
CPC ............ *H04L 63/083* (2013.01); *H04L 63/10* (2013.01); *H04N 21/25875* (2013.01); *H04W 12/06* (2013.01); *H04L 2209/56* (2013.01); *H04L 2209/603* (2013.01); *H04L 2209/80* (2013.01); *H04W 12/00522* (2019.01)

(58) Field of Classification Search
CPC ........... H04L 2209/603; H04L 2209/80; G06F 21/6218; H04W 12/06; H04W 12/00522; H04N 21/25875
See application file for complete search history.

(56) References Cited

U.S. PATENT DOCUMENTS

| | | | |
|---|---|---|---|
| 6,018,761 | A | 1/2000 | Uomini |
| 6,029,164 | A | 2/2000 | Birrell et al. |
| 6,085,100 | A | 7/2000 | Tarnanen |
| 6,151,507 | A | 11/2000 | Laiho et al. |
| 6,169,911 | B1 | 1/2001 | Wagner et al. |
| 6,178,331 | B1 | 1/2001 | Holmes et al. |
| 6,263,365 | B1 | 7/2001 | Scherpbier |
| 6,309,305 | B1 | 10/2001 | Kraft |
| 6,346,952 | B1 | 2/2002 | Shtivelman |
| 6,630,944 | B1 | 10/2003 | Kakuta et al. |
| 6,727,916 | B1 | 4/2004 | Ballard |
| 6,826,596 | B1 | 11/2004 | Suzuki |
| 6,847,974 | B2 | 1/2005 | Wachtel |
| 7,024,556 | B1 | 4/2006 | Hadjinikitas et al. |
| 7,028,263 | B2 | 4/2006 | Maguire |
| 7,356,833 | B2 | 4/2008 | Byrne |
| 7,484,177 | B2 | 1/2009 | Maguire |
| 7,493,616 | B2 | 2/2009 | Yach et al. |
| 7,515,036 | B2 | 4/2009 | McClenny et al. |
| 7,522,549 | B2 | 4/2009 | Karaoguz et al. |
| 7,570,655 | B2 | 8/2009 | Hassan et al. |
| 7,581,244 | B2 | 8/2009 | Li et al. |
| 7,583,965 | B2 | 9/2009 | Caspi et al. |
| 7,761,861 | B2 | 7/2010 | Bentz et al. |
| 7,818,005 | B2 | 10/2010 | Caspi et al. |
| 7,827,497 | B2 | 11/2010 | Maguire |
| 7,840,631 | B2 | 11/2010 | Farcasiu |
| 7,991,399 | B2 | 8/2011 | Ganesan |
| 7,992,197 | B2 | 8/2011 | Naaman et al. |
| 8,055,899 | B2 | 11/2011 | Levy et al. |
| 8,060,016 | B2 | 11/2011 | Jung et al. |
| 8,156,197 | B1 | 4/2012 | Livingston et al. |
| 8,359,062 | B2 | 1/2013 | Tu et al. |
| 2002/0170047 | A1 | 11/2002 | Swetland |
| 2004/0025022 | A1 | 2/2004 | Yach et al. |
| 2004/0215830 | A1 | 10/2004 | Shenfield |
| 2005/0091693 | A1 | 4/2005 | Amine et al. |
| 2005/0144020 | A1 | 6/2005 | Muzaffar et al. |
| 2007/0076696 | A1 | 4/2007 | An et al. |
| 2007/0089110 | A1 | 4/2007 | Li |
| 2007/0256135 | A1 | 11/2007 | Doradla et al. |
| 2008/0098225 | A1* | 4/2008 | Baysinger ............. H04L 63/083 713/171 |
| 2008/0108308 | A1 | 5/2008 | Ullah |
| 2008/0134342 | A1 | 6/2008 | Shamoon et al. |
| 2008/0151842 | A1 | 6/2008 | Tysowski et al. |
| 2008/0160492 | A1 | 7/2008 | Campbell et al. |
| 2008/0167954 | A1 | 7/2008 | Kawakami |
| 2008/0168129 | A1* | 7/2008 | Robbin ................. H04L 67/322 709/203 |
| 2008/0172285 | A1* | 7/2008 | Hurowitz ........... G06Q 30/0261 455/414.1 |
| 2008/0214215 | A1* | 9/2008 | Aaltonen ............ G06F 16/9577 455/466 |
| 2008/0244679 | A1 | 10/2008 | Sukumar et al. |
| 2008/0281977 | A1 | 11/2008 | Branam et al. |
| 2008/0282191 | A1* | 11/2008 | Branam et al. ................ 715/810 |
| 2009/0047989 | A1 | 2/2009 | Harmon et al. |
| 2009/0049297 | A1 | 2/2009 | Omernick et al. |
| 2009/0113527 | A1* | 4/2009 | Naaman ................. G06F 21/41 726/5 |
| 2009/0124284 | A1 | 5/2009 | Scherzer et al. |
| 2009/0168676 | A1 | 7/2009 | Olson |
| 2009/0193266 | A1* | 7/2009 | Gable et al. .................. 713/193 |
| 2009/0298535 | A1 | 12/2009 | Klein et al. |
| 2010/0304730 | A1 | 12/2010 | Huang et al. |
| 2011/0119720 | A1 | 5/2011 | Fan et al. |
| 2011/0169913 | A1 | 7/2011 | Karaoguz et al. |
| 2011/0224992 | A1 | 9/2011 | Chaoui et al. |
| 2012/0016989 | A1 | 1/2012 | Fuller |
| 2012/0166604 | A1 | 6/2012 | Fortier et al. |
| 2012/0167126 | A1 | 6/2012 | Peak et al. |
| 2012/0260282 | A1 | 10/2012 | Dasher et al. |
| 2013/0162160 | A1 | 6/2013 | Ganton et al. |
| 2013/0163442 | A1 | 6/2013 | Livingston |

FOREIGN PATENT DOCUMENTS

| | | |
|---|---|---|
| CA | 2472474 | 12/2004 |
| EP | 0932130 A2 | 7/1999 |
| WO | WO 99/49392 | 9/1999 |
| WO | WO 0003316 A1 | 1/2000 |
| WO | WO 01/37567 A1 | 5/2001 |
| WO | WO 2011/075825 | 6/2011 |

OTHER PUBLICATIONS

Connecting to the Internet: Boxee Support, Nov. 8, 2010, [Online] <URL: http://support.boxes.tv/entries/323358-connecting-to-the-internet> (2 pages).

How do I setup my Boxee Box?, Nov. 9, 2010, [Online] <URL: http://support.boxee.tv/entries/325270-how-to-i-setup-my-boxee-box> (1 page).

International Search Report and Written Opinion dated Apr. 4, 2011 for PCT/CA2010/001994, filed Dec. 21, 2010.

Extended European Search Report for European Patent Application No. 10838458.7, dated Mar. 19, 2015.

Office Action for U.S. Appl. No. 13/332,488, dated Jul. 31, 2014.
Office Action for U.S. Appl. No. 13/332,488, dated Jan. 30, 2014.
Office Action for U.S. Appl. No. 13/332,488, dated Aug. 7, 2013.

* cited by examiner

SYSTEMS AND METHODS FOR ACCESSING AND CONTROLLING MEDIA STORED REMOTELY

CROSS-REFERENCE TO RELATED APPLICATION

This application claims priority to and the benefit of U.S. Provisional Patent Application No. 61/288,622, filed Dec. 21, 2009, entitled "System and Method for Accessing and Controlling Media Stored Remotely," which is incorporated herein by reference in its entirety.

BACKGROUND

Some embodiments described herein relate to systems and methods for accessing and controlling media. More specifically, embodiments described herein relate to systems and methods for accessing media stored remotely from a user and for controlling the presentation, display, playback and/or other access to that media.

With the availability of broadband connections to the Internet, remote storage of data has become more commonplace. Individuals can store their email, digital photographs, music, videos and/or other media on servers maintained and operated by third parties. Such servers can be physically located in various locations.

Such known systems, however, have some disadvantages. For example, accessing a user's stored media may require the user to go through an onerous login process or may limit the user to accessing the data from a particular location and/or from a particular device (such as a personal computer). Further, a variety of devices exist, such as advanced gaming systems like the Sony Play Station 3 (PS3)® or Microsoft Xbox 360®, which can access media remotely stored. Such known advanced gaming systems, however, have user interfaces that make displaying and/or playing such media awkward.

Accordingly, a need exists for systems and methods that provide easy access to remotely stored media. Additionally, a need exists for systems and methods that simplify presentation of media.

SUMMARY

Embodiments described herein relate to systems and methods for accessing and controlling media stored remotely.

In some embodiments, a method for storing media on a server and accessing that media, includes: (i) establishing an account with the server and associating a unique identifier and corresponding password with the account; (ii) transferring media to the server for association with the account; (iii) connecting a communication device to the server through a data communications network and authenticating that communication device to the server with the unique identifier and corresponding password; (iv) with the communication device, selecting one or more items of media from the media associated with the account and transferring a copy of the selected items to the communication device to be presented to the user.

In some embodiments, the communication device can be a smartphone. In some embodiments, the method can also include a second communication device capable of establishing a web browser session with the server. The second communication device can be configured to render the selected media. The server can provide an authentication code to the second communication device to be displayed in the web browser session and a user can input the displayed authentication code into the smartphone (i.e., the first communication device). The smartphone can forward the authentication code to the server to authenticate the browser session to access the media in the established account.

In some embodiments, a user can establish an account with a remote server and can then store media on the server for access remotely. The remote access can be via a smartphone, which executes a software application including a login function and which can render media supplied by the server. Alternatively, the remote access can be via a web browser session on any device which can establish such a session with the server.

If the access is via a web browser session, the session can be authenticated by the user entering an authentication code, displayed by the server in the web browser session, into the software application executing on the smartphone. The software application can forward the authentication code back to the server to authenticate the web browser session.

In addition, the software application executing on the smartphone can be used to forward user input from the user input mechanisms of the smartphone to the server to control the rendering of media within the authenticated web browser session, thus allowing the smartphone to serve as a remote control for the web browser session.

DETAILED DESCRIPTION

Figure 1:
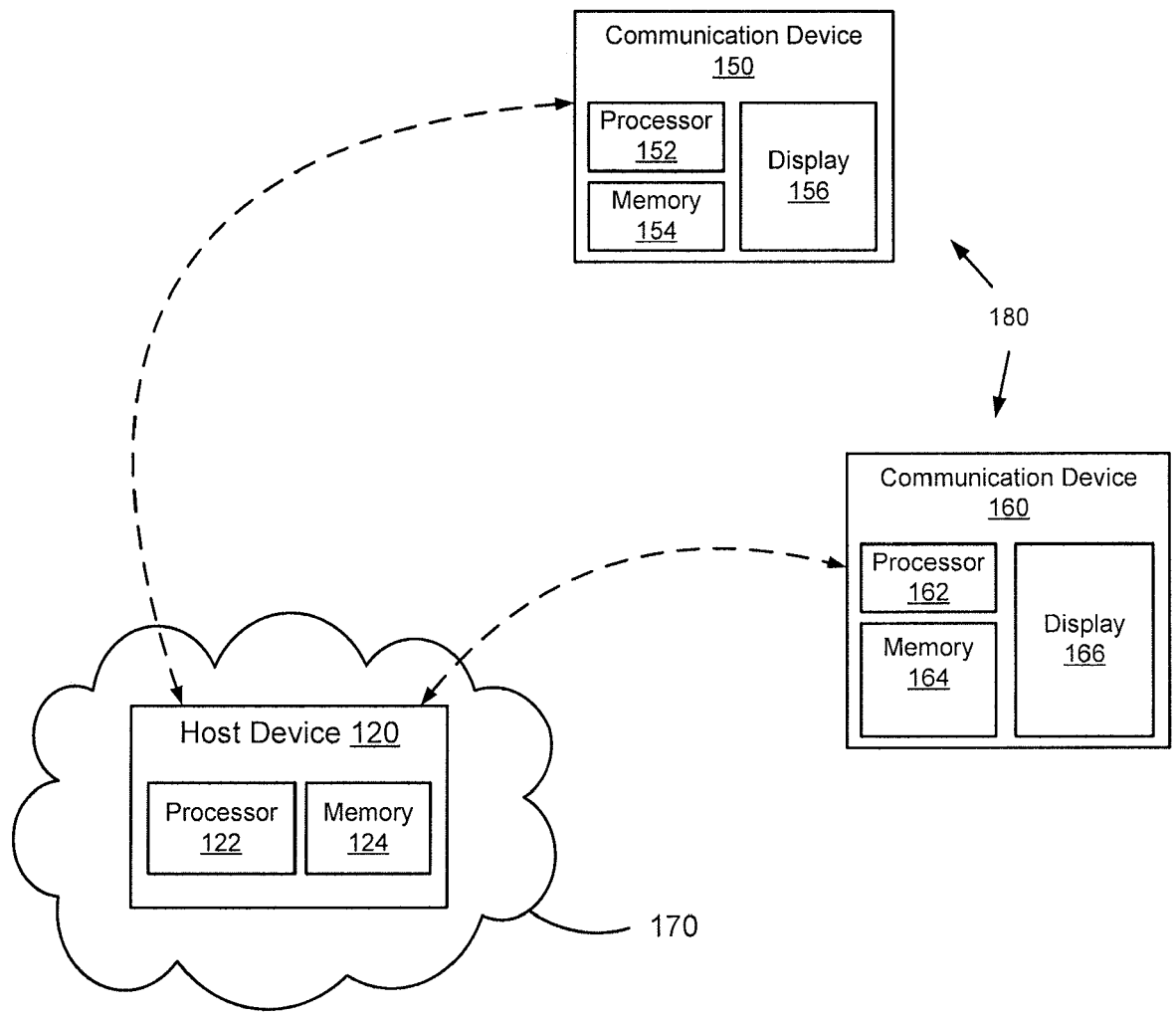
FIG. 1 is a schematic diagram that illustrates communication devices in communication with a host device via a network, according to an embodiment.

In some embodiments, a non-transitory processor-readable medium stores code representing instructions to cause a processor to receive, from a first communication device, a request to access a media file stored on a server. The media file is associated with a user account. The code represents instructions to cause the processor to send an authentication code to the first communication device such that the first communication device can present the authentication code to a user of the first communication device. The code further represents instructions to cause the processor to receive the authentication code from a second communication device associated with the user account and provide access to the media file from the first communication device based on receiving the authentication code from the second communication device.

In such embodiments, a user can use the second communication device to authorize access of the first communication device to the user's media file stored on a server. More specifically, because the second communication device is associated with a user's media storage account, the second communication device can be used to authorize other communication devices to access the user's media storage account on the server.

In some embodiments, a non-transitory processor-readable medium stores code representing instructions to cause a processor to send at least one media file to a first communication device such that the first communication device can present the at least one media file in a first configuration. The code further represents instructions to cause the processor to receive a first signal from a second communication device indicating a request to present the at least one media file in a second configuration on the first communication device. The code represents instructions to cause the processor to send, to the first communication device, a second signal instructing the first communication device to present the at least one media file in the second configuration.

In such embodiments, the second communication device can be used to control and/or modify the presentation of the at least one media file on the first communication device. Similarly stated, the second communication device can be used as a remote control for the presentation of the at least one media file on the first communication device. Signals sent to control the presentation of the at least one media file on the first communication device can be sent to the first communication device via a server operatively coupled to both the first communication device and the second communication device via a network.

In some embodiments, an apparatus includes a server that stores a set of media files associated with a user account. The server is configured to send an authentication code to a first communication device in response to a request from the first communication device to access the set of media files such that the first communication device can present the authentication code to a user. The server is configured to associate the user account with an identifier of a second communication device such that a user of the second communication device can authorize access to the set of media files from the first communication device by sending the authentication code to the server using the second communication device.

In some embodiments, a user can establish connectivity with a remote server for the purpose of accessing preexisting media files without a user account. Preexisting media files can include, but are not limited to, media files offered on a promotional basis (such as trailers for upcoming movies, samples of recently released compact discs (CDs), etc.), media files offered on an informational basis (such as news clips or portions of newscasts), and/or user generated media. Such methods can include a first communication device that connects to the server through a data communications network and registers with the server with a unique identifier. In some embodiments, the first communication device can be a smartphone, a mobile phone, a personal digital assistant (PDA), a tablet personal computer (PC), an iPod®, an iPad®, and/or so forth. In such embodiments, the method can also include a second communication device capable of establishing a web browser session with the server. The second communication device can be configured to render the selected media. The server can provide an authentication code to the second communication device to be displayed in the web browser session and a user can input the displayed authentication code into the first communication device (e.g., a smartphone). The first communication device can forward the authentication code to the server. In response to receiving the authentication code, the second communication device can be associated with and/or linked to the first communication device. Thus, the first communication device can be used to control the media rendered and/or presented on the second communication device. In such embodiments, media accessed by the second communication device can be restricted on the basis of a variety of factors including, but not limited to, the unique identifier supplied by the first communications device, the authentication code provided to the second communication device, as well as contextual factors including the geographic locations of the first and/or second communications devices and/or the time of day.

As used herein, the term media can include substantially any digital data that can be stored and retrieved by a user. Examples of media include, without limitation, digital photographs, email, music, videos, games, text files, and/or the like.

FIG. 1 is a schematic diagram that illustrates communication devices 180 in communication with a host device 120 running a media storage service, via a network 170, according to an embodiment. Specifically, communication device 150 is configured to communicate with the host device 120. Similarly, communication device 160 is configured to communicate with the host device 120. The network 170 can be any type of network (e.g., a local area network (LAN), a wide area network (WAN), a virtual network, a telecommunications network) implemented as a wired network and/or wireless network. As described in further detail herein, in some embodiments, for example, the communication device 150 is a mobile handheld device connected to the host device 120 via a cellular data connection and the communication device 160 is a personal computer connected to the host device 120 via an Internet Service Provider (ISP) and the Internet.

The host device 120 can be any type of device configured to send data over the network 170 to and/or receive data from one or more of the communication devices 180. In some embodiments, the host device 120 can be configured to function as, for example, a server device (e.g., a web server device), a network management device, a data repository and/or the like.

The host device 120 includes a memory 124 and a processor 122. The memory 124 can be, for example, a random access memory (RAM), a memory buffer, a hard drive, a database, an erasable programmable read-only memory (EPROM), an electrically erasable read-only memory (EEPROM), a read-only memory (ROM) and/or so forth. In some embodiments, the memory 124 stores instructions to cause the processor 122 to execute modules, processes and/or functions associated with a media storage service.

The processor 122 of the host device 120 can be any suitable processing device configured to run and/or execute a media storage service. For example, the processor 122 can be configured to store, present, and/or retrieve media in response to receiving a signal from a communication device 180, as described in further detail herein. In some embodiments, the processor 122 can be a general purpose processor, a Field Programmable Gate Array (FPGA), an Application Specific Integrated Circuit (ASIC), a Digital Signal Processor (DSP), and/or the like.

Each of the communication devices 180 can be, for example, a computing entity (e.g., a personal computing device such as a desktop computer, a laptop computer, a Netbook, etc.), a mobile phone, a personal digital assistant (PDA), a tablet personal computer (PC), an iPod®, an iPad®, and/or so forth. Although not shown, in some embodiments, each of the communication devices 180 can include one or more network interface devices (e.g., a network interface card) configured to connect the communication devices 180 to the network 170. In some embodiments, the communication devices 180 can be referred to as client devices.

As shown in FIG. 1, the communication device 160 has a processor 162, a memory 164, and a display 166. The memory 164 can be, for example, a random access memory (RAM), a memory buffer, a hard drive, and/or so forth. The display 166 can be any suitable display, such as, for example, a liquid crystal display (LCD), a cathode ray tube display (CRT) or the like. Similar to communication device 160, the communication device 150 has a processor 152, a memory 154, and a display 156. In other embodiments, the communication devices 150, 160 include another output device instead of or in addition to the displays 156, 166. For example, the communication devices 150, 160 can include an audio output device (e.g., a speaker), a tactile output device, and/or the like.

In some embodiments, one or more portions of the host device 120 and/or one or more portions of the communication devices 180 can include a hardware-based module (e.g., a digital signal processor (DSP), a field programmable gate array (FPGA)) and/or a software-based module (e.g., a module of computer code to be executed at a processor). In some embodiments, one or more of the functions associated with the host device 120 (e.g., the functions associated with the processor 122) can be included in one or more modules. In some embodiments, one or more of the functions associated with the communication devices 180 (e.g., functions associated with processor 152 or processor 162) can be included in one or more modules.

In some embodiments, one or more of the communication devices 180 can be configured to perform one or more functions associated with the host device 120, and vice versa. For example, in some embodiments, at least a portion of the media storage service is executed at a communication device 160. For example, in some embodiments, a communication device 160 can execute a media account application configured to interface with the media storage service on the host device 120.

Figure 2:
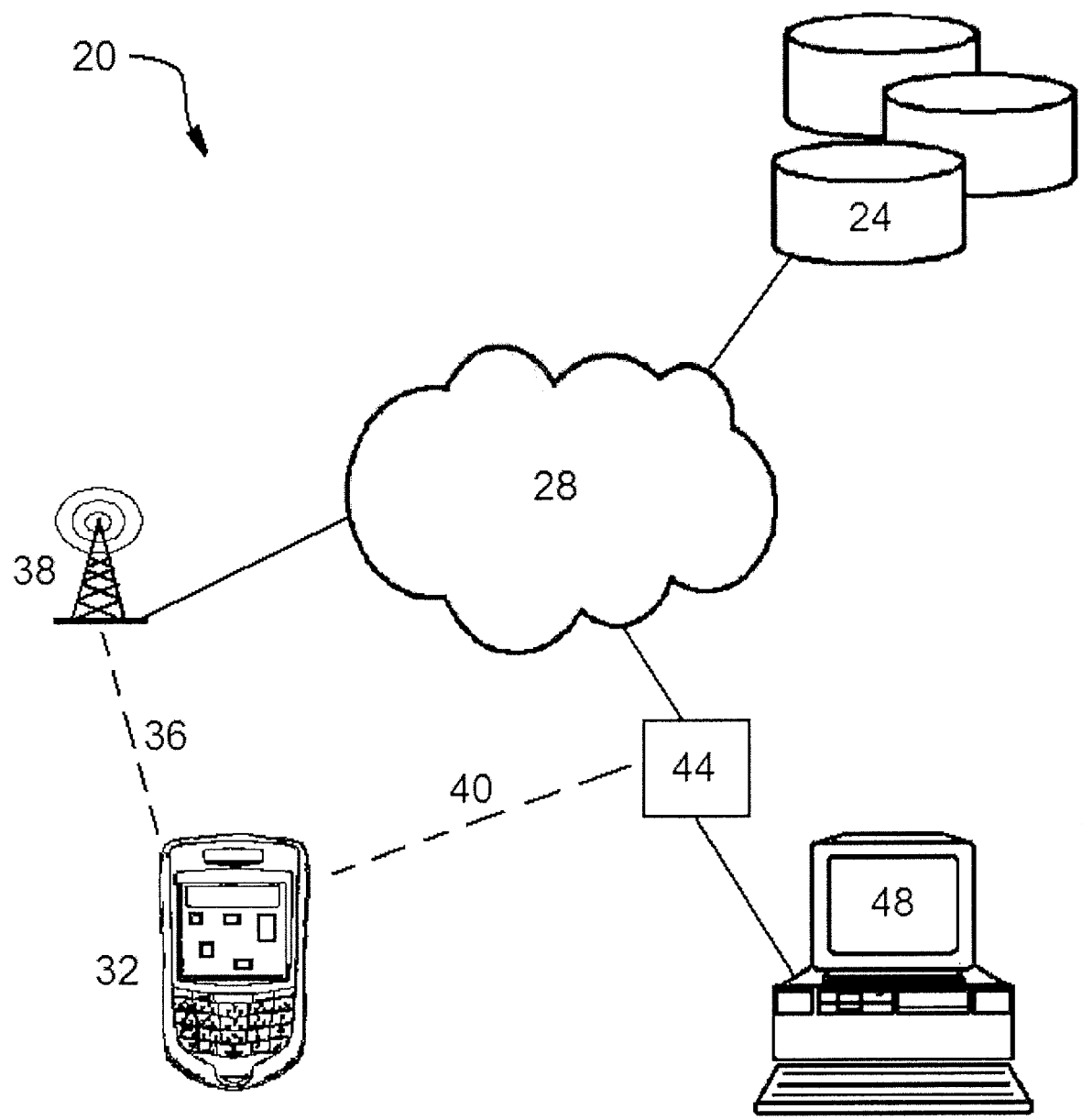
FIG. 2 is a schematic representation of a system, according to an embodiment.

FIG. 2 illustrates a system 20 for accessing and controlling media stored remotely, according to an embodiment. System 20 includes at least one server 24 on which media can be stored by a user of system 20. System 20 is operably connected to a data communications network 28.

Server 24 can be any suitable device, or set of devices, or service for storing, maintaining and making available data to users through a network, such as communications network 28. In some embodiments, for example, server 24 can be similar to the host device 120 shown and described with respect to FIG. 1. As such, the server 24 can include at least one processing device (e.g., a processor, a digital signal processor (DSP), a field programmable gate array (FPGA), etc.) and a memory. For example, a memory of server 24 can store code representing instructions to be executed by a processor of server 24 such that the processor of server 24 can run and/or execute a data storage application. Such a data storage application can be configured to allow a user to store media and/or other data in the memory on the server 24. In such embodiments, such a memory can include a media database. Additionally, the user can access the media by accessing the server using a communication device (e.g., communication device 32 or communication device 48).

Server 24 can include multiple computer server devices (e.g., each having a processor and a memory), or the like, located at various locations. Such multiple computer server devices can be connected virtually, through data communication network 28. For example, portions of the data stored on server 24 associated with a user may be licensed to the user. Such data can be stored on a device forming part of server 24. Such a device can be maintained by the licensor of the data as part of a digital rights management system.

Data communications network 28 can be any suitable network such as, for example, the Internet, a standalone public or private network, a public or private network connected to the Internet or any other public or private suitable data communications network. In some embodiments, data communications network 28 can be similar to network 170, shown and described above with respect to FIG. 1. For example, data communications network can be any suitable wireless and/or wired network, such as, for example, an intranet, a wireless area network (WAN), a local area network (LAN), a cellular network, and/or the like. Data communications network 28 can be configured to provide one or more communication devices with access to the server 24.

System 20 further includes communication device 32. Communication device 32 can include a processing device (e.g., a processor, a digital signal processor (DSP), a field programmable gate array (FPGA), etc.) and a memory. In some embodiments, for example, the memory of communication device 32 stores code representing instructions to be executed by the processor of communication device 32 such that the processor of communication device 32 can run and/or execute a media account application and/or a browser session on communication device 32.

Communication device 32 can be similar to communication devices 180, shown and described above with respect to FIG. 1. In some embodiments, for example, communication device 32 can be a smartphone, such as a Blackberry Bold® manufactured by Research in Motion or an iPhone® manufactured by Apple. In addition to providing cellular telephony services, smartphone can be configured to execute software applications (in a processor) and can include user input devices, such as a keyboard and/or touch screen, and/or user output devices, such as a display screen and/or audio playback system. Moreover, smartphone can transmit and receive digital data via one or more digital communications links. While communication device 32 is shown and described herein as being a smartphone with cellular telephony capabilities, in other embodiments, any communication device capable of accessing the server 24 via data communications network 28 can be used. For example, communication device 32 can be a computing entity (e.g., a personal computing device such as a desktop computer, a laptop computer, etc.), a mobile phone, a personal digital assistant (PDA), a tablet personal computer (PC), an iPod®, an iPad®, a Netbook, and/or the like.

In FIG. 2, communication device 32 is illustrated as including a cellular data link 36 (such as an HSPA data link) to a cellular data network 38 and a WiFi data link 40 (such as an 802.11n data link). Cellular data network 38 can access data communications network 28, as can WiFi data link 40, which is connected to data communications network 28 through a combination of a modem, router and wireless access point 44. While shown as including both cellular data and WiFi data communications links, in other embodiments, communication device 32 includes only a single data communications link, or more than two data communications links.

In some embodiments, communication device 32 can be the principal mechanism for enabling access and control of media stored on server 24 by the user. As described in detail below, using communication device 32, a user can store media on server 24, access that media through data communication network 28 and, enable access to that stored media by another communication device 48 connected to data communications network 28. Communication device 48 can be similar to the communication devices 180, shown and described with respect to FIG. 1. For example, communication device 48 can be a personal computer, a gaming machine (e.g., Sony PS3 or Microsoft Xbox 360, etc.), a laptop computer, a mobile phone, a personal digital assistant (PDA), a tablet personal computer (PC), an iPod®, an iPad®, and/or the like. In some embodiments, communication device 32 can be used to control the playback and access of the media on communication device 48.

Figure 3:
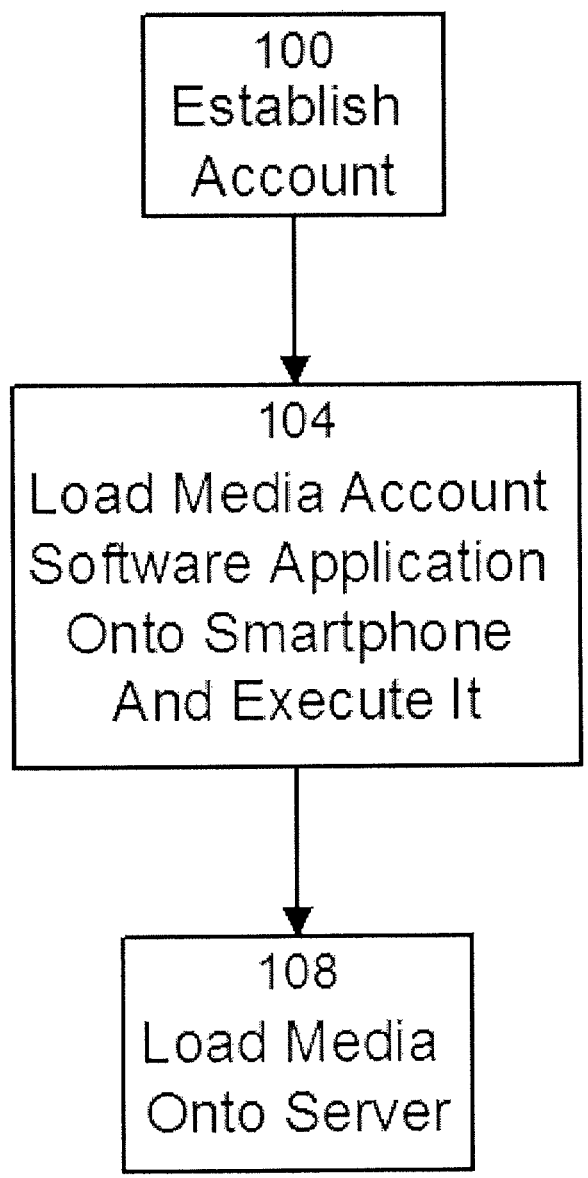
FIG. 3 is a flow chart illustrating a method of storing media on a server, according to an embodiment.

FIG. 3 shows a flowchart outlining a method of establishing a user account on server 24 and loading media into that account. Using system 20, a user can load media onto server 24 using a variety of methods, including uploading media (such as digital photographs, etc.) through data communications network 28 using communication device 32, or communication device 48. Similarly, a user can purchase media, such as music, photographs and/or videos, from a media vending service associated with server 24 through communication device 32 and/or through communication device 48.

Accordingly, at step 100, the user establishes an account on server 24. More specifically, the user establishes an account with a media storage service executed by server 24. In some embodiments, the establishment of the account can be performed with communication device 32, either through a session in a hypertext markup language (HTML) web browser or via a specific application (e.g., a media account software application) executing on communication device 32 that the user can download to communication device 32.

As part of the establishment of the account, a unique identifier can be associated with the user. In some embodiments, such a unique identifier can be an email address supplied by the user, a user name provided by the user, a telephone number provided by the user, and/or the like. Further, a password is selected by and/or assigned to the user.

After the account is established, the user can load a media account software application onto communication device 32 (typically through data communications network 28) and the communication device 32 can execute that application, at step 104. When prompted by the media account application, the user can input their unique identifier and password into the media account application. The media account application can log the user onto server 24 with the user's unique identifier and password and can initiate a session for the user with server 24. In some embodiments, the session for the user can be maintained by server 24 while communication device 32 is connected to data communications network 28 (through data link 36 or data link 40 or via any other suitable connection) and can be automatically re-established after a disconnection and re-connection of communication device 32 from data communications network 28.

In some embodiments, the user can associate communication device 32 with their account with the media storage service at server 24. More specifically, server 24 can associate an identifier (e.g., a telephone number, a media access control (MAC) address, an internet protocol (IP) address, an identifier assigned by server 24, etc.) of communication device 32 with the user's account. In such embodiments, server 24 can automatically (i.e., without providing login information) provide access to the media stored on server 24 associated with the user's account when server 24 is accessed by communication device 32. Additionally, as described in further detail herein, because communication device 32 is associated with the user's account, communication device 32 can be used to authorize access to the user's media stored on server 24 from another communication device (e.g., communication device 48).

While described above as using a downloaded media account software application on communication device 32 to communicate with an account on server 24, in other embodiments, the user can communicate with their account on server 24 using a web browser session on communication device 32, or communication device 48.

After the media account application on communication device 32 is logged into the user's account on server 24 (i.e., the user's account with a media storage service executed at server 24), the user can load media onto server 24, at step 108. More specifically, the user can store media in a memory at the server 24. As mentioned above, media can be loaded onto server 24 using various methods, such as, for example, uploading media from communication device 32 (or from a browser session initiated on communication device 48) to server 24 through data communications network 28; purchasing media, such as music or videos, from a media vending service associated with server 24 and accessed from the media account application; and/or the like. In some embodiments, step 108 can be re-performed whenever a user wishes to add media to their account on server 24.

Figure 4:
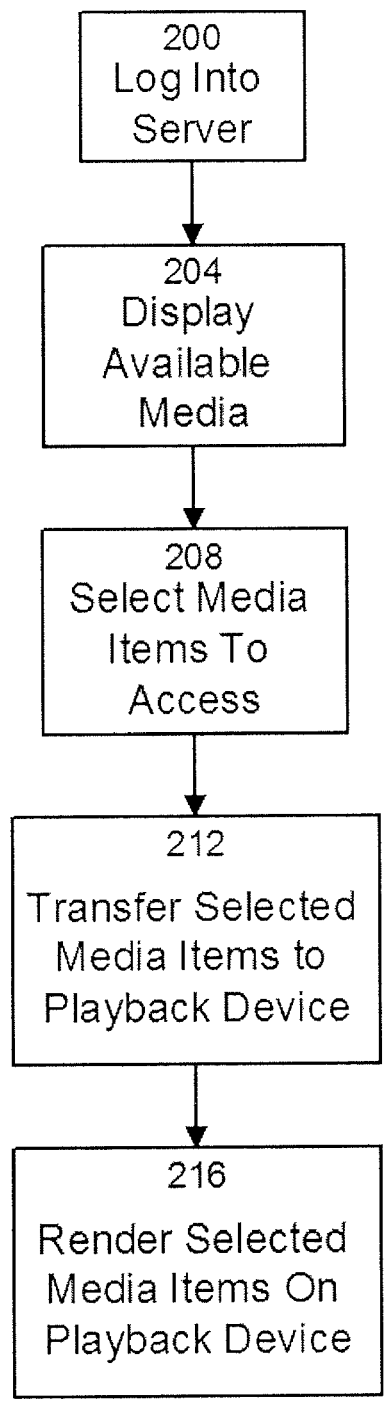
FIG. 4 is a flow chart illustrating a method of retrieving media from a server, according to an embodiment.

FIG. 4 shows a flowchart of a method of a user accessing and controlling media in system 20. At step 200, the user logs into their previously established account on server 24. If the user is accessing their account from communication device 32, and if the media account application previously downloaded to communication device 32 is executing, then step 200 can be automatically performed by the media account application. More specifically, because, as described above, communication device 32 can be associated with the user's account, the server 24 can automatically authenticate communication device 32 as being associated with the user. As such, any media stored at the server from communication device 32 can be automatically associated with the user.

If the media account application is not executing on the user's communication device 32, or if the user is not accessing server 24 from communication device 32 (instead, for example, accessing server 24 from an HTML browser session on communication device 48) then the user can input their unique identifier and password, when prompted, to log into server 24.

At step 204, the available media within the user's account, or otherwise available to the user, can be displayed to the user (e.g., on a display of communication device 32 or communication device 48). The specific method of displaying the available media to the user is not particularly limited, and text-based (with listings of available media) or graphical-based interfaces (with appropriate icons representing media items) can be used.

The available media items can be, for example, items that were previously uploaded to server 24 by the user, items purchased by the user from a media vending service associated with server 24 and/or items offered by server 24 on a promotional basis (such as trailers for upcoming movies, samples of recently released CDs, etc.). Further, the selected items can be meta items of available media, such as playlists of songs, slideshows of digital photographs, folders of email messages, and/or the like, previously defined by the user or others.

At step 208, the user can select one or more media items from the displayed available media items. After the user has selected one or more media items to access, the media items can be transferred from server 24, through data communications network 28, to the appropriate destination playback device, at step 212. Specifically, if the user has accessed server 24 from communication device 32, the selected media items can be transferred to communication device 32 for rendering. Similarly, if the user has accessed server 24 from a web browser on communication device 48, the selected media items are transferred to communication device 48 for appropriate rendering (i.e., playback of video or music, display of text or email files, etc.).

In the case where the selected media items are music and/or videos, the transfer of those media items to the playback device can occur by streaming the media items through data communications network 28 as they are played by the destination playback device, with a suitable stream caching of the media items to prevent "drop outs" or other interruptions of playback due to network delays or interruptions. The use of streaming allows for digital rights management to be employed with purchased media items and reduces the amount of memory required in the playback device, as the media items are not stored on the playback device prior to playback.

In other embodiments, media items can be downloaded and stored on the playback device. In particular, media items such as music can be downloaded to the playback device and cached at the playback device with a suitable caching strategy ("last played, last out", etc.). This provides substantially immediate playback of commonly accessed media items. In such embodiments, if digital rights management is a concern, the cached files can be stored in an encrypted format only accessible from the media account software application executing on communication device 32. As such, caching to another communication device (e.g., communication device 48) can be prevented.

At step 216, the selected media items can be rendered by the playback device (e.g., communication device 32 or communication device 48). For example, pictures and email can be displayed, audio and video files can be played, and/or the like.

As described above, a user can access available media in their account from the communication device 32 (e.g., a smartphone), as well as from any other communication device 48 (e.g., a desktop computer) connected to data communications network 28 and capable of running a web browser. In such an embodiment, the user can establish an authenticated web browser session between communication device 48 and server 24 to access their available media.

Figure 5:
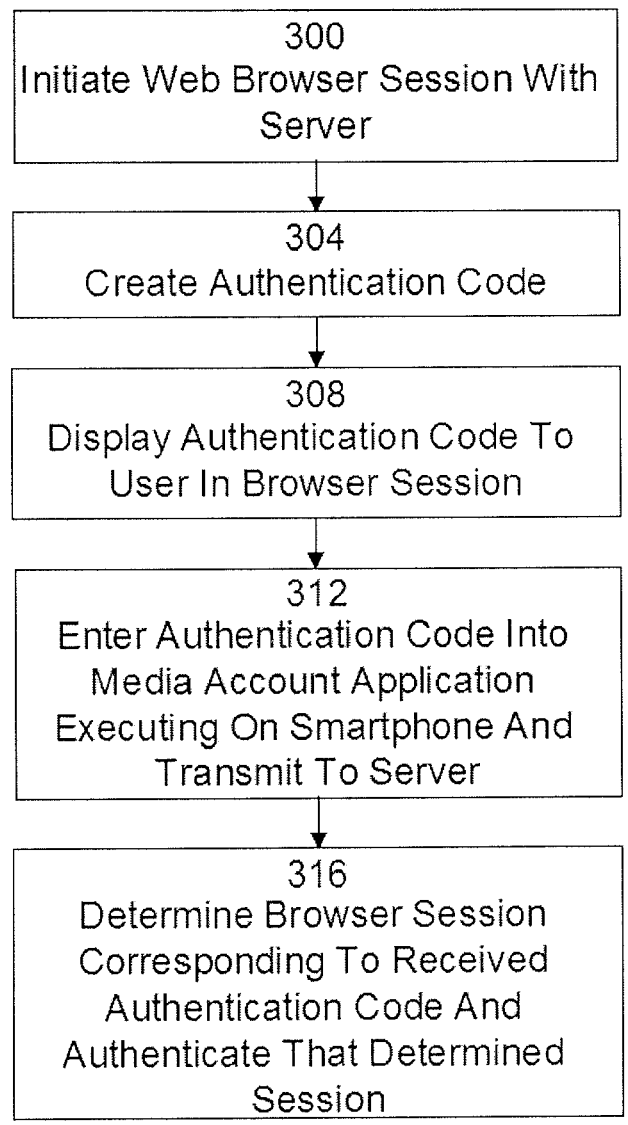
FIG. 5 is a flowchart illustrating a method of authenticating a session with the server, according to an embodiment.

To simplify this process, an authentication method, illustrated by the flow chart of FIG. 5, can be used. Specifically, at step 300 the user initiates a web browser session with server 24. This is accomplished by directing the web browser of communication device 48 to a predetermined uniform resource locator (URL) associated with server 24, for example www.kik.com.

After the browser session is initiated, server 24 defines a unique authentication code for the session, at step 304. The particular style or type of authentication code is not particularly limited and a wide range of types of authentication codes can be used. In some embodiments, the authentication code can be a text string, such as a word or phrase. For example, the authentication code can be a string of random alpha-numeric characters (numbers, letters and/or special characters), such as, for example, "XQTYRW". In other embodiments, the authentication code can be an image, a one-dimensional bar code, a two-dimensional bar code (e.g., a quick response (QR) code), an audio sequence and/or any other identifier for uniquely identifying a browser session. After the authentication code is defined by server 24, it is presented (e.g., displayed and/or played) to the user in the browser session, at step 308.

The user can receive the authentication code in the browser display and, at step 312, input the authentication code into the media account application executing on communication device 32 (e.g., on a smartphone). The media account application can then transmit the entered authentication code to server 24. In other embodiments, the authentication code can be input into a web-browser executing on communication device 32.

In embodiments where the authentication code is a word, phrase or string of letters, the user can copy that text into the media account application or web-browser for transmission to server 24. In the case where the authentication code is an image or bar code, the user can use a digital camera and/or barcode scanner of communication device 32 to photograph and/or scan the display of the web browser session, including the authentication code. In some embodiments, such a digital image can be processed by communication device 32 to extract a representation of the authentication code. That representation can be sent to server 24. In other embodiments, the digital image can be sent to and processed at server 24. In still other embodiments, any other suitable authentication code types and/or methods of capturing codes can be used.

At step 316, when server 24 receives an authentication code from communication device 32, server 24 determines the browser session for which that unique authentication code was defined. Similarly stated, server 24 identifies the browser session identified by that unique authentication code. That browser session can then be authenticated as belonging to the user whose communication device 32 transmitted the authentication code to server 24. More specifically, because the communication device 32 is associated with a user account, server 24 can identify that user account and associate the browser session identified by the authentication code with that user account. If no browser session can be identified by the received authentication code (for example if the user incorrectly transcribed the code), then an error message can be sent to the communication device 32 that transmitted the authentication code.

After a browser session at communication device 48 is authenticated as belonging to a user, that user's available media can be accessed from communication device 48 for the duration of the browser session. More specifically, the user can view, play, and/or edit the media associated with their account on communication device 48. Thus, a user can access their available media on server 24 from any device (e.g., communication device 48) capable of establishing a browser session with server 24.

In some embodiments, the playback or rendering of media on communication device 48 can be controlled and/or modified from communication device 32. Such embodiments can be used, for example, when device 48 is a device with a limited or awkward user interface for accessing and controlling the playback or rendering of media. For example, while gaming devices such as the Sony PS3 and Microsoft Xbox 360 are capable of rendering a wide range of media, their standard user interfaces are not particularly well suited to controlling that rendering and/or playback.

In some embodiments, after a browser session on a communication device 48 is authenticated, the media account application executing on the user's communication device 32 can function as a user input device for the browser session. Specifically, the media account application executing on communication device 32 can capture user input to communication device 32 and forward that captured user input to server 24. Server 24 can interpret that captured user input as user input to the authenticated browser session on communication device 48.

For example, the user's movement of a roller ball on communication device 32 or the use of a touch screen on communication device 32 can be captured by the media account application and forwarded to server 24. Server 24 can interpret the movement or use as the equivalent of the use of a mouse and/or keyboard within the authenticated browser session executing on communication device 48.

The media account application on communication device 32 can also display user interface icons specific to media rendering and/or playback tasks that the user can access from communication device 32. For example, the media account application can display icons representing the typical controls for music playback, such as "play", "fast forward", "pause", "shuffle", etc. on the display of communication device 32. The user can then select one or more of these icons with the user input features of communication device 32 (e.g., with a roller ball, a mouse, a keypad, a touch screen, etc.). A corresponding command can be transmitted by communication device 32 to server 24 to control and/or modify the rendering and/or playback of the media within the authenticated browser session on communication device 48. For example, if the use selects the icon corresponding to "pause", communication device 32 can transmit a pause command to server 24. Server 24 can, in response to receiving the pause command, pause the rendering of the media (e.g., a video and/or song) in the authenticated browser session. More specifically, the server 24 can send a signal to communication device 48 to pause the rendering and/or can pause streaming media to communication device 48.

Thus, a user interface appropriate for the type of media being rendered in the authenticated browser session can be displayed on communication device 32 and used by the user to control the rendering of the media in the authenticated browser session on communication device 48. While the provision of such user interfaces can greatly ease the control of the rendering of the media compared to the interfaces natively offered by communication device 48, this method of controlling the rendering media within the authenticated browser session can serve as a generalized remote control. For example, a user may establish and authorize a browser session for the playback of music media at a party, where communication device 48 is in one room of the party venue. In such a case, the user can employ communication device 32 to control the playback of the music (skip songs, replay songs, etc.) from other rooms of the venue than the room in which communication device 48 is located.

While shown and described above as being associated with a user account, in other embodiments, a user without an account with a media storage service can establish connectivity with a server 24 for the purpose of accessing media files stored at server 24. Such media files may include, but are not limited to, media files offered on a promotional basis (such as trailers for upcoming movies, samples of recently released compact discs (CDs), etc.), media files offered on an informational basis (such as news clips or portions of newscasts), or user generated media.

Similar to the method described with respect to FIG. 5, a user can initiate a web browser session with server 24 using a communication device 48. The server 24 can provide a unique identifier to a web-browser session on the communication device 48 and the user can input the authentication code on another communication device 32. The communication device 32 can send the authentication code to the server 24 via the network 28. The server, using the authentication code, can associate and/or link the web-browser session on the communication device 48 with the communication device 32.

In some embodiments, server 24 can automatically associate an identifier (e.g., a telephone number, a media access control (MAC) address, an internet protocol address, an identifier assigned by server 24, etc.) of communication device 32 with an identifier of the browser session on communication device 48. Using the association between the communication device 32 and the communication device 48, the communication device 32 can control and/or modify presentation of the media on the communication device 48, as described above. If no browser session can be identified by the received authentication code (for example if the user incorrectly transcribed the code), then an error message can be sent to the communication device 32 that transmitted the authentication code.

After a browser session at communication device 48 is associated with the communication device 32, authorized media can be accessed from communication device 48 for the duration of the browser session. More specifically, server 24 can identify authorized media files which are accessible at communication device 48 given the unique authentication code and/or a unique identifier associated with communication device 32, as well as contextual factors including, but not limited to, the geographic locations of the first or second communication devices and/or the time of day. Accordingly, using the authentication code, a user without an account can access media stored on the server.

Embodiments described herein illustrate methods and systems for accessing and controlling media stored remotely from a user. A user can establish an account with a remote server and can then store media on the server for access remotely. The remote access can be via a communication device, which executes a media account application including a login function and which can render media supplied by the server. A user can also remotely access and control authorized preexisting content remotely without establishing an account via a unique identifier upon an authentication sequence. Alternatively, the remote access can be via a web browser session on a communication device capable of establishing such a session with the server.

In some embodiments, if the access is via a web browser session, the session can be authenticated by the user entering an authentication code, displayed by the server in the web browser session, into the media account application executing on the communication device. That media account application can forward the authentication code to the server to authenticate the web browser session.

In some embodiments, the media account application executing on the communication device (i.e., in a processor of communication device) can be used to forward user input from user input mechanisms of the communication device to the server to control the rendering of media within the authenticated web browser session. In such embodiments, the communication device can be used as a remote control for the web browser session.

In some embodiments, the media is streamed to the communication device for rendering and/or is cached on the communication device, in an encrypted manner, to permit digital rights management techniques to be applied to the media.

While various embodiments have been described above, it should be understood that they have been presented by way of example only, and not limitation and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described. Where methods described above indicate certain events occurring in certain order, the ordering of certain events may be modified. Additionally, certain of the events may be performed concurrently in a parallel process when possible, as well as performed sequentially as described above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

What is claimed is:

1. A non-transitory processor-readable medium storing code to be executed by a processor of a server, the code comprising code representing instructions to:
   send a signal representing an authentication code to a first communication device such that the authentication code is presented by the first communication device;
   receive a signal representing the authentication code from a second communication device, the authentication code not being associated with a user account; and
   define an association between the first communication device and the second communication device in response to receiving the signal representing the authentication code from the second communication device such that the second communication device is configured to control data sent to the first communication device, the association defined without receiving any signal from the first communication device or the second communication device containing an indication of the user account.

2. The non-transitory processor-readable medium of claim 1, the code further comprising code representing instructions to:
   receive a request for the data from the second communication device; and
   transfer the data to the first communication device based on the association and the request for the data.

3. The non-transitory processor-readable medium of claim 2, wherein at least a portion of the data is stored on the second communication device.

4. The non-transitory processor-readable medium of claim 2, wherein the data is at least one media file stored in a media database accessible by the server.

5. The non-transitory processor-readable medium of claim 2, wherein the code representing instructions to transfer the data to the first communication device based on the association includes code representing instructions to stream media to the first communication device.

6. The non-transitory processor-readable medium of claim 2, wherein the code representing instructions to transfer the data to the first communication device includes code representing instructions to stream media to the first communication device, the code further comprising code representing instructions to:
   receive, from the second communication device, an indication to control the media streamed to the first communication device; and
   control the media streamed to the first communication device in response to the indication.

7. The non-transitory processor-readable medium of claim 2, wherein the code representing instructions to receive the request for the data includes code representing instructions to receive the request for data from the second communication device without the data being received by the first communication device.

8. The non-transitory processor-readable medium of claim 1, wherein the authentication code is configured to be presented by the first communication device as a barcode configured to be scanned by the second communication device.

9. The non-transitory processor-readable medium of claim 1, the code further comprising code representing instructions to:
   provide, to the second communication device an indication of data available for transfer to the first communication device.

10. The non-transitory processor-readable medium of claim 1, wherein the code representing instructions to send the signal representing the authentication code includes code representing instructions to send the signal representing the authentication code from the processor to the first communication device and not via the second communication device.

11. The non-transitory processor-readable medium of claim 1, wherein the signal representing the authentication code is received from the second communication device in response to the signal representing the authentication code being sent to the first communication device.

12. The non-transitory processor-readable medium of claim 1, wherein the signal representing the authentication code received from the second communication device is devoid of a user-defined authentication code.

13. An apparatus comprising:
   a server configured to send a signal representing an authentication code to a compute device, the authentication code not being associated with a user account;

the server configured to receive, from a mobile communication device, a signal representing the authentication code and an identifier associated with the mobile communication device, the server not storing an association between the mobile communication device and the user account before receiving the signal representing the authentication code, the server configured to define an association between the compute device and the mobile communication device based on receiving the identifier and the signal representing the authentication code received from the mobile communication device, the server configured to define the association between the compute device and the mobile communication device without receiving a signal containing an indication of the user account from the mobile communication device prior to the server defining the association; and the server configured to transfer data to the compute device based on a request received from the mobile communication device and based on the association, the data not transferred via the mobile communication device.

14. The apparatus of claim 13, wherein the server is operatively coupled to a media database, the server operable to transfer media from the media database to the compute device.

15. The apparatus of claim 13, wherein the authentication code is configured to be presented on the compute device as a barcode configured to be scanned by the mobile communication device.

16. The apparatus of claim 13, wherein the authentication code includes a plurality of alpha-numeric characters.

17. The apparatus of claim 13, wherein the server is configured to send, to the mobile communication device, a signal representing data available for transfer to the compute device.

18. The apparatus of claim 13, wherein the data is associated with streaming media, the server is configured to receive, from the mobile communication device, an instruction to pause the streaming media, the server configured to pause the transfer of streaming media to the compute device based on the instruction.

19. The apparatus of claim 13, wherein the signal representing the authentication code sent to the first communication device is not sent to the first communication device via the second communication device.

20. A method, comprising:

receiving, at a first communication device and directly from a second communication device, an authentication code associated with the second communication device, the authentication code not being associated with a user account;

transmitting, from the first communication device, a signal representing the authentication code to a server such that the server defines an association between the first communication device and the second communication device;

receiving, a request for media at the first communication device after transmitting the signal representing the authentication code without having transmitted any indication of the user account; and sending, from the first communication device, to the server, and based on the request for media, instructions to transfer the media such that the server provides the media to the second communication device based on the association.

21. The method of claim 20, wherein the receiving the authentication code includes scanning a barcode.

22. The method of claim 20, wherein the receiving the authentication code includes receiving a plurality of alpha-numeric characters.

23. The method of claim 20, further comprising:

controlling, using the first communication device, the transfer of the media from the server to the second communication device.

24. The method of claim 20, further comprising instructing the server to control transfer of media from the server to the second communication device.

25. The method of claim 20, wherein the server does not provide the media to the first communication device.

\* \* \* \* \*